United States Patent
Regan et al.

(10) Patent No.: US 11,558,119 B2
(45) Date of Patent: Jan. 17, 2023

(54) OPTICAL INTERCONNECTS

(71) Applicant: Hewlett Packard Enterprise Development LP, Houston, TX (US)

(72) Inventors: James Donald Regan, Fort Collins, CO (US); Mauricio Madiedo, Fort Collins, CO (US); David Ritter Thomas, Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 73 days.

(21) Appl. No.: 17/303,184

(22) Filed: May 24, 2021

(65) Prior Publication Data

US 2022/0376795 A1 Nov. 24, 2022

(51) Int. Cl.
*H04B 10/12* (2006.01)
*H04B 10/50* (2013.01)
*H04B 10/572* (2013.01)

(52) U.S. Cl.
CPC ......... *H04B 10/506* (2013.01); *H04B 10/572* (2013.01)

(58) Field of Classification Search
CPC .. H04B 10/506; H04B 10/572; H04B 10/505; H04B 10/2912; H04B 10/548; H04B 10/07955; H04B 10/0775; H04B 10/40; H04B 10/503; H04B 10/508; H04J 14/02; H01S 3/094096; H01S 3/10015; H01S 3/302; H01S 3/13013
USPC ........ 398/141, 140, 183, 173, 175, 177, 178
See application file for complete search history.

(56) References Cited

U.S. PATENT DOCUMENTS

| | | | |
|---|---|---|---|
| 6,919,987 B2 | 7/2005 | Takatsu et al. | |
| 7,445,389 B2 | 11/2008 | Aronson | |
| 9,341,920 B1* | 5/2016 | Reed | G02F 1/39 |
| 10,581,551 B2* | 3/2020 | Mikami | H04J 14/02 |
| 2004/0001715 A1* | 1/2004 | Katagiri | H04B 10/2916 398/81 |
| 2019/0042507 A1* | 2/2019 | Venkatesan | H04L 25/08 |

FOREIGN PATENT DOCUMENTS

| | | |
|---|---|---|
| EP | 1312975 | 5/2003 |
| EP | 0944189 | 7/2009 |
| JP | 2003046457 | 2/2003 |
| JP | 2008199098 | 8/2008 |

* cited by examiner

*Primary Examiner* — Hibret A Woldekidan
(74) *Attorney, Agent, or Firm* — Hewlett Packard Enterprise Patent Department (57) ABSTRACT

According to an example, a transmitter transmits a plurality of optical signals of multiple wavelengths via an optical link to a receiver. An optical link tuner coupled to the optical link groups the plurality of optical signals into a first group of optical signals and a second group of optical signals, where the first group of optical signals has a first wavelength range and the second group of optical signals has a second wavelength range. The optical link tuner adjusts link tuning parameters associated with the first group of optical signals during a first phase, such that the second group of optical signals is propagated to the receiver without modifications to link tuning parameters associated with the second group, where during the first phase the receiver is to detect unplugging of the optical link based on the second group of optical signals.

20 Claims, 4 Drawing Sheets

OPTICAL INTERCONNECTS

BACKGROUND

Transmitters and receivers are used to perform communications over an optical link between electronic devices. A transmitter is used to transmit optical signals over the optical link which is received by a receiver. An optical link, such as an optical fiber or waveguide, may add noise to the signal propagated across optical link, and so the received signal may be a noisy version of the transmitted signal. In addition, the transmitted signal may be distorted if the amplitude response of the optical link over a frequency range is not flat.

Thus, before a transmitter and a receiver can successfully communicate data over an optical link, a link tuning process is performed over the optical link between the transmitter and the receiver. In some examples, the link tuning process includes equalization of the transmitter and the receiver so that optical signals may be communicated across the optical link with minimum distortion and losses. Equalization enables the optical signals to be accurately reproduced at the receiver and balances out the amplitude response of the optical signals over the frequency range.

BRIEF DESCRIPTION OF THE DRAWINGS

Some embodiments are described with respect to the following figures.

DETAILED DESCRIPTION

Electronic devices (e.g. computers, storage devices, network devices, input/output (I/O) devices, processors, memory devices, etc.) that are coupled over an optical link can include transmitters and receivers that are used for transmitting optical signals and receiving optical signals, respectively. Examples of optical links include optical fibers, optical waveguides, and so forth.

Optoelectronic communication (e.g., using optical signals to transmit electronic data) is becoming more prevalent as a potential solution, at least in part, to the ever increasing demand for high bandwidth, high quality, and low power consumption data transfer in applications such as high performance computing systems, large capacity data storage servers, backbone networks, enterprise networks, storage area networks and network devices. Wavelength division multiplexing (WDM) is useful for increasing communication bandwidth by combining and sending multiple different data channels or wavelengths from one or more optical sources over an optical link. Optical interconnects allow propagation of optical signals of multiple wavelengths across an optical link, such as a waveguide, between transmitter-receiver (transceiver) pairs. In some examples, the optical interconnects can provide coarse wavelength division multiplexing (CWDM) to dense wavelength division multiplexing (DWDM) for propagating the optical signals.

In optical interconnects, a transceiver at a first end of an optical link is physically coupled to another transceiver at a second end via the optical link. Thus, the optical link may function as a bi-directional link propagating optical signals. At a transmitter, the electrical circuitry may include a signal driver that produces output electrical signals corresponding to data bits to be communicated. The electrical signals from the signal driver may be provided to an optical element such as a laser diode, which is able to convert the electrical signals into corresponding optical signals that are transmitted over the optical link. An example of the laser diode is a vertical-cavity surface-emitting laser (VCSEL). At the receiver at the second end, received optical signals are converted by an optical element, such as a photo diode or other type of photo detector, into electrical signals that are processed by electrical circuitry at the receiver.

In some examples, the optical link coupling the two transceivers may get accidentally unplugged at either end or may get severed. Since, the transmitter uses lasers as an optical source, unplugging or severing of the optical link may cause scattering of laser beams which may be harmful for eyes of technicians/operators in the vicinity of the optical interconnect. When the optical link is unplugged or severed, a signal strength of the optical signals received at the receiver reduces and may fall below a detection threshold of the receiver. The detection threshold refers to a minimum power level of optical signals which the receiver is configured to receive to successfully reproduce the received optical signals. In some examples, on receiving optical signals below the detection threshold at the receiver, a processing circuitry at the receiver may be configured to detect that the optical link is unplugged or severed and, as a consequence, may disable the transmitter at the second end. Since, the transmitter at the second end gets disabled, the receiver at the first end also does not receive optical signals and thereby detects that the optical link is unplugged or severed. Detection of unplugging or severing of the optical link, as discussed above, may be hereinafter referred to as unplug detection in optical links. Unplug detection ensures eye safety of technicians and operators working in the vicinity of the optical links by shutting off the transmitters in case of an unplug. Thus, errors in unplug detection may be hazardous and unsafe.

Consider that an optical link is communicating optical signals of multiple wavelengths using WDM. In an example, during link tuning, amplitudes/swings of the optical signals may be varied over a wide range to determine gain response of the optical signals at the receiver based on which optimal settings of amplitude may be selected. During link tuning, when the amplitude of the optical signals is reduced to low values, the signals strength of the optical signals may reach below the detection threshold of the receiver. On receiving the optical signals having signal strength below the detection threshold, the receiver may incorrectly detect that the optical link is unplugged or severed consequently resulting in false positives in unplug detection.

Further, the optical link may generally behave as a low pass filter thereby allowing low frequency optical signals to be propagated through the optical link with lower losses as compared to losses for high frequency optical signals. As a result, high frequency optical signals may be attenuated during propagation through the optical link. To compensate for this, frequency response equalization may be performed. Frequency response equalization, also referred to as equalization, is an example of link tuning. During equalization, amplitude of low frequency optical signals may be reduced due to pre-emphasis at the transmitter and amplitude of high frequency optical signals may be boosted. Thus, in some examples, as a consequence of the pre-emphasis, low frequency optical signals may be over-damped and signal strength of the low frequency optical signals received at the receiver may fall below the detection threshold, which may cause the receiver to incorrectly detect that the optical link is unplugged or severed. Thus, during link tuning, there are chances of incorrect unplug detection, i.e., false positives in unplug detection. Due to the false positives, the transmitters on both ends of the optical link may be unintentionally shut off consequently interrupting the link tuning process. Due to frequent interruptions in the link tuning process, link tuning may have to re-initiated from the beginning which may be inefficient, erroneous, and time consuming.

In some examples, to address the issue of false unplug detection during link tuning, unplug detection may be temporarily disabled during link tuning. However, disabling unplug detection, even temporarily, may be hazardous and unsafe for technicians and operators handling the optical links or any person within the range of the laser-based optical signals, in case of occurrence of an actual unplug. In other examples, link tuning may be performed for a portion of the range of amplitudes of the optical signals. The amplitudes of the optical signals may be varied to an extent such that at any given time, the signal strength of the optical signals do not fall below the detection threshold. Since, the amplitudes are not lowered below the detection threshold, chances of false positives in unplug detection may be lower. However, in such examples, link tuning of the optical link for low amplitude values, particularly, for signals with signal strengths below the detection threshold remains incomplete. Thus, optical signals of low range of amplitude values with signal strengths near the detection threshold may not be successfully communicated over the optical link due to inadequate link tuning in that range. Thus, link tuning in such examples may be inadequate and inefficient.

The present disclosure provides techniques for performing link tuning selectively on a first group of optical signals propagated across the optical link at one time, while a second group of optical signals are allowed to be propagated across the optical link without being subjected to link tuning and thereby their amplitude/swing, frequencies, etc. are not varied. Since, amplitude/swing, frequencies of the second group of optical signals remain unchanged, potential drop in the signal strengths of the second group of optical signals below the detection threshold may be reduced/eliminated. Thus, the second group of optical signals may be used for accurate unplug detection and false positives in unplug detection may be avoided.

In accordance with an example of the present disclosure, an optical interconnect includes a first electronic device, also referred to as the first device, including a transmitter configured to transmit a plurality of optical signals of multiple wavelengths. The plurality of optical signals may be transmitted using WDM. The optical interconnect includes a second electronic device, also referred to as a second device, including a receiver and an optical link coupling the transmitter to the receiver such that the plurality of optical signals is propagated from the transmitter to the receiver across the optical link. The optical interconnect includes an optical link tuner coupled to the optical link. In an example, the optical link tuner may include configuration settings for performing link tuning by varying link tuning parameters, such as amplitude/swing, optical dc power, frequency, gains of receivers and amplifiers coupled to the optical link, etc. In an example, the optical link tuner may configure the transmitter to vary the link tuning parameters during link tuning. In an example, link tuning may include adjusting link tuning parameters associated with the optical signals so that the optical signals can be propagated across the optical link with minimal noise and distortion and data communicated over the optical signals can be accurately reproduced at the receiving end. The optical link tuner may be configured to group the plurality of optical signals into a first group of optical signals and a second group of optical signals, where the first group of optical signals has a first wavelength range and the second group of optical signals has a second wavelength range. The optical link tuner may further adjust link tuning parameters associated with the first group of optical signals during a first phase, such that the second group of optical signals is propagated to the receiver without modifications to link tuning parameters associated with the second group. In an example, during the first phase, the unplug detection may be based on a signal strength of the second group of optical signals. In an example, on completing the first phase, the optical link tuner may adjust link tuning parameters associated with the second group of optical signals during a second phase, where during the second phase the receiver is to detect unplugging of the optical link based on the first group of optical signals. In an example, during the second phase, the unplug detection may be based on the signal strength of the first group of optical signals. Thus, amplitude/swing of the second group of signals remain majorly unaltered during the first phase of link tuning, although the amplitude/swing of the first group of signals may be varied over the range for link tuning. Therefore, during the first phase, the second group of signals may be used for accurate unplug detection, because chances of a drop in the signal strengths of the second group of optical signals below the detection threshold is reduced/eliminated. Likewise, amplitude/swing of the first group of signals remain substantially unaltered during the second phase of link tuning, although the amplitude/swing of the second group of signals may be varied over the range for link tuning. Therefore, during the second phase, the first group of signals may be used for accurate unplug detection, because chances of a drop in the signal strengths of the first group of optical signals below the detection threshold is reduced/eliminated. In this manner, the present disclosure facilitates accurate unplug detection with reduced false positives.

Figure 1:
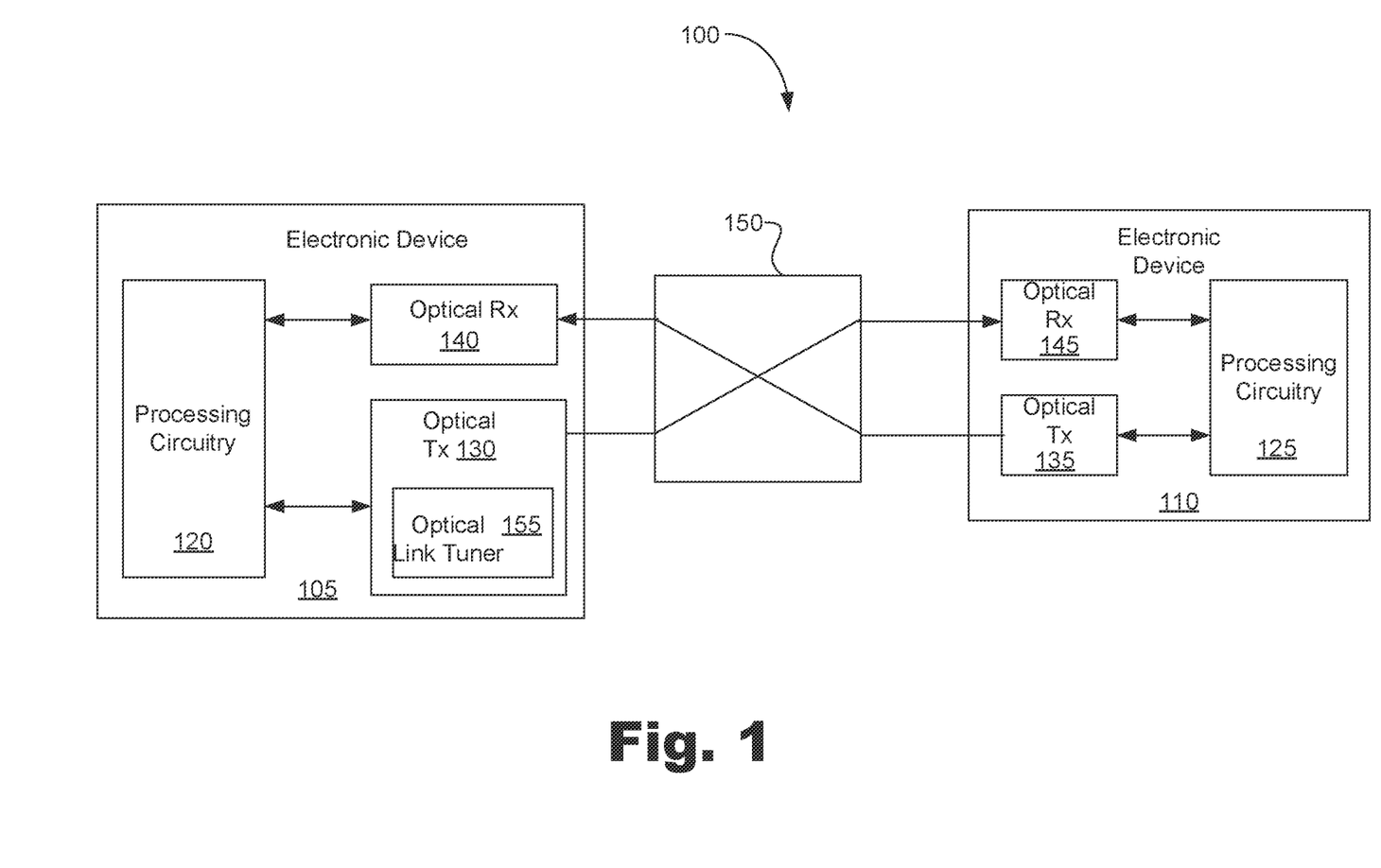
FIG. 1 is a schematic diagram of an example arrangement that includes communication devices coupled over an optical link, where the communication devices have transmitters and receivers, according to an example.

FIG. 1 illustrates an optical interconnect 100 for bidirectional optical communication between a first electronic device 105 and a second electronic device 110. Each of the electronic devices (105, 110) include a processing circuitry (120, 125), respectively, for performing application-specific and/or general purpose processing functionality. In connection with this processing functionality, the electronic devices (105, 110) communicate with each other optically. To this end, each of the electronic devices (105, 110) includes a transmitter (130, 135) for modulating digital data onto an optical signal output from the electronic device (105, 110) and an optical receiver (140, 145) for receiving and decoding modulated digital data on an optical signal received at the electronic device (105, 110).

The optical interconnect 100 includes the electronic devices (105, 110) and an optical link 150 disposed intermediate the first and second electronic devices (105, 110) to establish bidirectional optical communication between the first and second electronic devices (105, 110). Specifically, the optical link 150 optically couples the transmitter 130 of the first electronic device 105 to the receiver 145 of the second electronic device 110. Additionally, the optical link 150 optically couples the transmitter 135 of the second electronic device 110 to the receiver 140 of the first electronic device 105. Under this configuration, a modulated optical beam emitted from the transmitter 130 of the first electronic device 105 is received by the receiver 145 of the second electronic device 110, and a modulated optical beam emitted from the transmitter 135 of the second electronic device 110 is received by the optical receiver 140 of the first electronic device. The modulated optical beam may include a plurality of optical signals of multiple wavelengths. The plurality of optical signals is propagated from the transmitter to the receiver across the optical link 150.

The optical transmitter 130 includes an optical link tuner 155. The optical link tuner 155, also referred to as the equalizer 155, may include a processor and processor-executable instructions stored on a machine readable medium for performing link tuning operations according to examples described herein. Although, a single optical link tuner is shown in FIG. 1, there may be multiple link tuners coupled to the optical link 150. Further, in some examples, the transmitter 135, receivers (140, 145) may also include an optical link tuner similar to the link tuner 155. In some examples, link tuning of the optical signals propagated through the optical link 150 may be performed after each amplifier stage (not shown) in the optical link. In some examples, the link tuner 155 may include a digital equalizer, such as a dynamic gain equalizer, an adaptive equalizer, or a decision feedback equalizer. The link tuner 155 may include multiple filters which may isolate optical signals of different wavelengths and either boosts them, dampens them, or leaves them unchanged.

The link tuner 155 may filter a plurality of optical signals propagated through the optical link 150. Based on the filtering, the link tuner 155r may isolate a first group of optical signals and a second group of optical signals from the plurality. In an example, the link tuner 155 may include a band-pass filter configured to isolate optical signals in a first wavelength range. Thus, the first group of optical signals in the first wavelength range is subjected to link tuning, i.e., link tuning parameters of the first group of optical signals may be varied during a first phase of equalization. During the first phase, link tuning parameters associated with a second group of optical signals in a second wavelength range remain unaltered. Thus, the second group of optical signals may be used for unplug detection by the receiver. Since, the link tuning parameters of the second group of optical signals remain unaltered, the signal strength of the second group of optical signals remain above the detection threshold of the receiver and, as a consequence, may be used for accurate unplug detection.

Figure 2A:
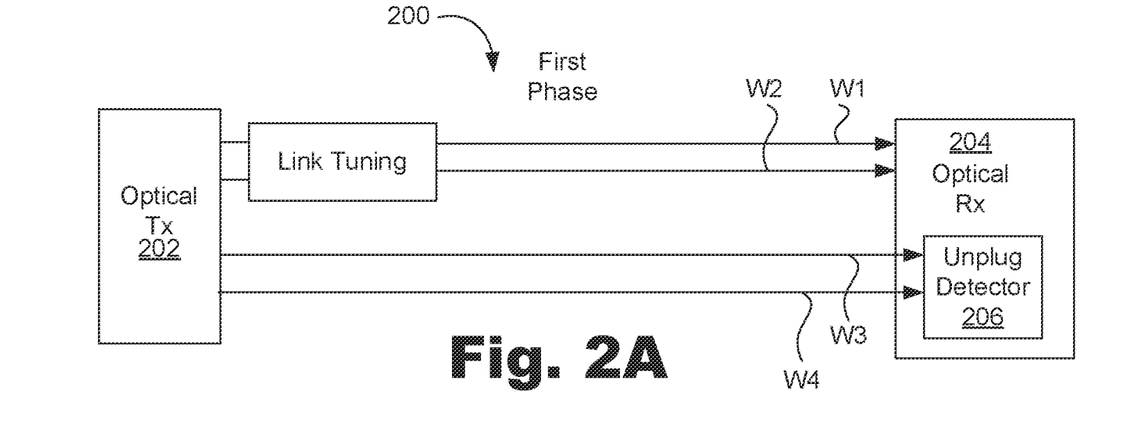
FIG. 2A is a schematic diagram of an example arrangement that includes communication devices coupled over an optical link and illustrates a first phase of link tuning, according to an example.

FIG. 2A is a schematic diagram of an example arrangement 200 that includes communication devices coupled over an optical link and illustrates a first phase of link tuning, according to an example. As shown in FIG. 2A, an optical transmitter 202 transmits optical signals to an optical receiver 204 across an optical link (not shown in FIG. 2). The optical transmitter 202 and the optical receiver 204 may be similar to the optical transmitter 130 and the optical receiver 145 of FIG. 1. The optical link may be similar to the link 150. In an example, the transmitter 202 comprises a multi-wavelength optical source to provide the plurality of optical signals of multiple wavelengths. In another example, the transmitter 202 comprises a plurality of single wavelength optical sources to provide the plurality of optical signals of multiple wavelengths.

An optical link tuner may be coupled to the optical link towards the end of the transmitter. In an example, an equalizer may also be included in the optical link tuner. The transmitter 202 may be included in a transceiver of an electronic device, such as the first electronic device 105 of FIG. 1 and the receiver 204 may be included in a transceiver of another electronic device, such as the second electronic device 110 of FIG. 1.

Consider that the transmitter 202 transmits a plurality of optical signals (such as lasers) of four different wavelengths, viz., W1, W2, W3, and W4. Although, in this Figure, the transmitter is shown to transmit optical signals of four different wavelengths, in other examples, the transmitter may transmit optical signals of less than four or more than four wavelengths. The optical signals (W1-W4) are propagated across the optical link to the receiver 204. In an example, the link tuner may determine a number of the plurality of optical signals. Thus, based on the wavelengths W1-W4, the link tuner may determine that four optical signals are propagated through the optical link. The link tuner may identify the first wavelength range such that half of the plurality of optical signals is within the first wavelength range. Thus, in the example of FIGS. 2A and 2B, the link tuner may determine that the wavelength range 0 to W2 is a first wavelength range, such that half of the plurality of the optical signals, i.e., two of the four optical signals having wavelengths W1 and W2, is within the first wavelength range. Thus, the optical signals having wavelengths W1 and W2 are grouped as a first group of optical signals. The other half of the plurality of optical signals, i.e., optical signals having wavelengths W3 and W4 are grouped as a second group of optical signals. In an example, the plurality of optical signals may be passed through a filter assembly to obtain the first group of optical signals and the second group of optical signals.

During a first phase of link tuningr, link tuning parameters associated with the first group of optical signals having wavelengths W1 and W2 may be varied. Thus, in an example, the gain response of the optical signals over an amplitude range may be tested. In other examples, frequency response equalization may be performed for the first group of optical signals (W1 and W2). In an example, the link tuner may configure the transmitter to transmit link training data through the first group of optical signals during the first phase for performing link tuning. Thus, amplitude/swing of first group of optical signals may be varied over a range during the first phase and the signal strengths of the first group of optical signals at the receiver 204 may vary. During the first phase, the second group of optical signals (W3 and W4) are not subjected to link tuning. Thus, the second group of optical signals (W3 and W4) may be propagated to the receiver 204 without varying their amplitude and/or gains. Thus, during the first phase, each of the second group of optical signals (W3 and W4) have respective signal strengths greater than a signal detection threshold of the receiver 204, unless an actual unplugging of the optical link occurs. As shown in FIG. 2A, the second group of optical signals (W3 and W4) may be propagated to an unplug detector 206 in the receiver 204. During the first phase, the unplug detector 206 may detect unplugging of an optical link, in response to signal strengths of the second group of optical signals falling below the detection threshold of the receiver 204. In response to detection of unplugging of the optical link, the unplug detector 206 in the receiver 204 is configured to turn off a transmitter of the second device.

Figure 2B:
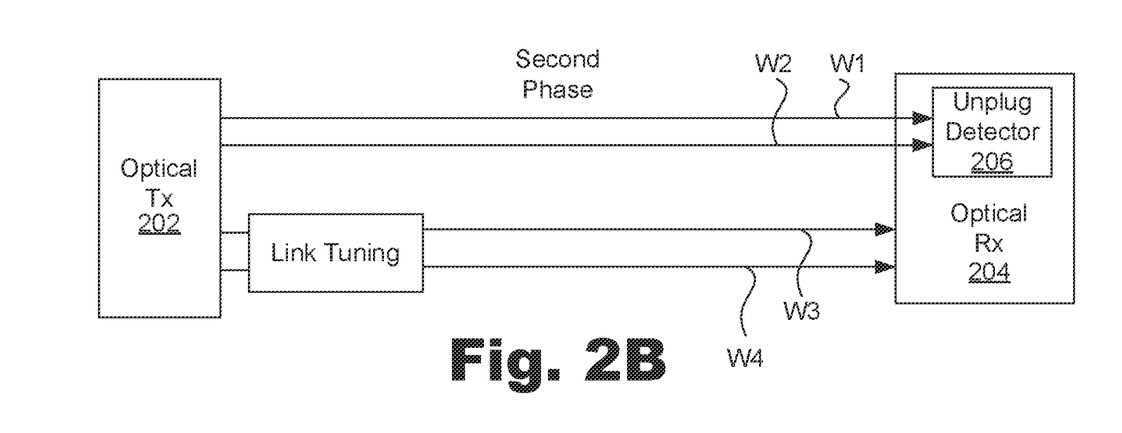
FIG. 2B is a schematic diagram of an example arrangement that includes communication devices coupled over an optical link and illustrates a second phase of link tuning, according to an example.

In response to completing the first phase, the link tuner is to adjust link tuning parameters associated with the second group of optical signals (W3 and W4) during a second phase, as shown in FIG. 2B. Thus, during the second phase, amplitude/swing of the second group of optical signals (W3 and W4) may be varied. In an example, during the second phase, the transmitter 202 may be configured to transmit link training data through the second group of optical signals (W3 and W4). Since, link tuning parameters associated with the first group of optical signals (W1 and W2) remain unaltered in the second phase, thus, if the optical link is intact, the first group of optical signals have respective signal strengths greater than the signal detection threshold. Therefore, during the second phase, the receiver is to detect unplugging of the optical link based on a signal strength of the first group of optical signals (W1 and W2), as illustrated in FIG. 2B.

In the first phase and the second phase, the unplug detector may detect unplugging of the optical link based on signal strength of the second group and the first group of optical signals, respectively. Consider that the optical link is unplugged or severed during the first phase. In such a scenario, the signal strength of the optical signals W3 and W4 may be substantially reduced and fall below the detection threshold of the receiver 204. Since, the signal strengths of the optical signals W3 and W4 falls below that detection threshold, the unplug detector 206 detects that the optical link has unplugged. It may be noted, that during the first phase, variations in amplitude, signal strength, etc., of the first group of optical signals (W1 and W2) does not impact detection of unplugging.

Likewise, consider that the optical link is unplugged or severed during the second phase. In such a scenario, the signal strength of the optical signals W1 and W2 may be substantially reduced and fall below the detection threshold of the receiver 204. Since, the signal strengths of the optical signals W1 and W2 fall below the detection threshold, the unplug detector may detect that the optical link has unplugged or severed. It may be noted, that during the second phase, variations in amplitude, signal strength, etc., of the second group of optical signals (W3 and W4) does not impact unplug detection.

Figure 3A:
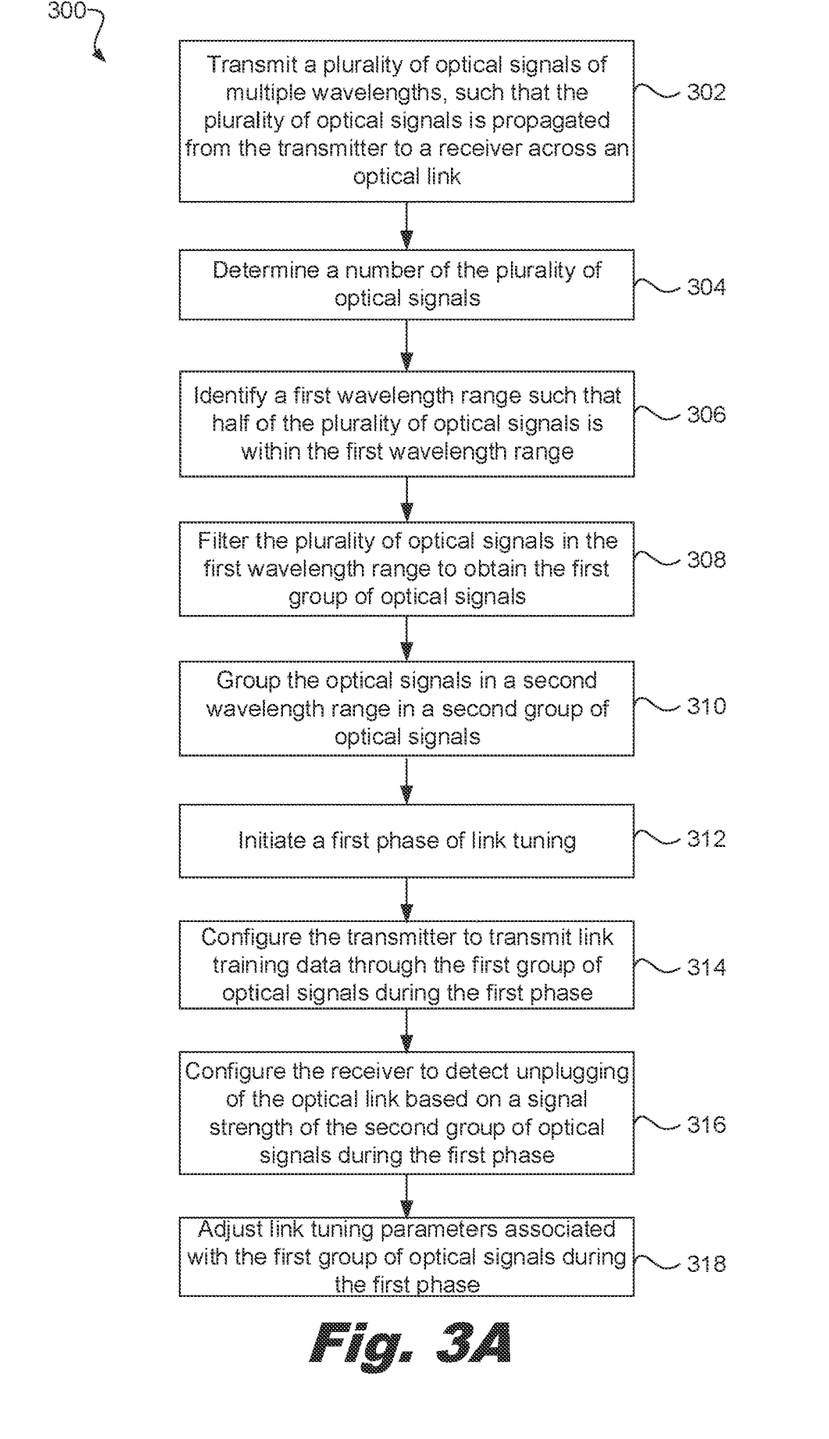
FIGS. 3A and 3B illustrates a flow diagram of a process of link tuning of an optical link, according to an example.
Figure 3B:
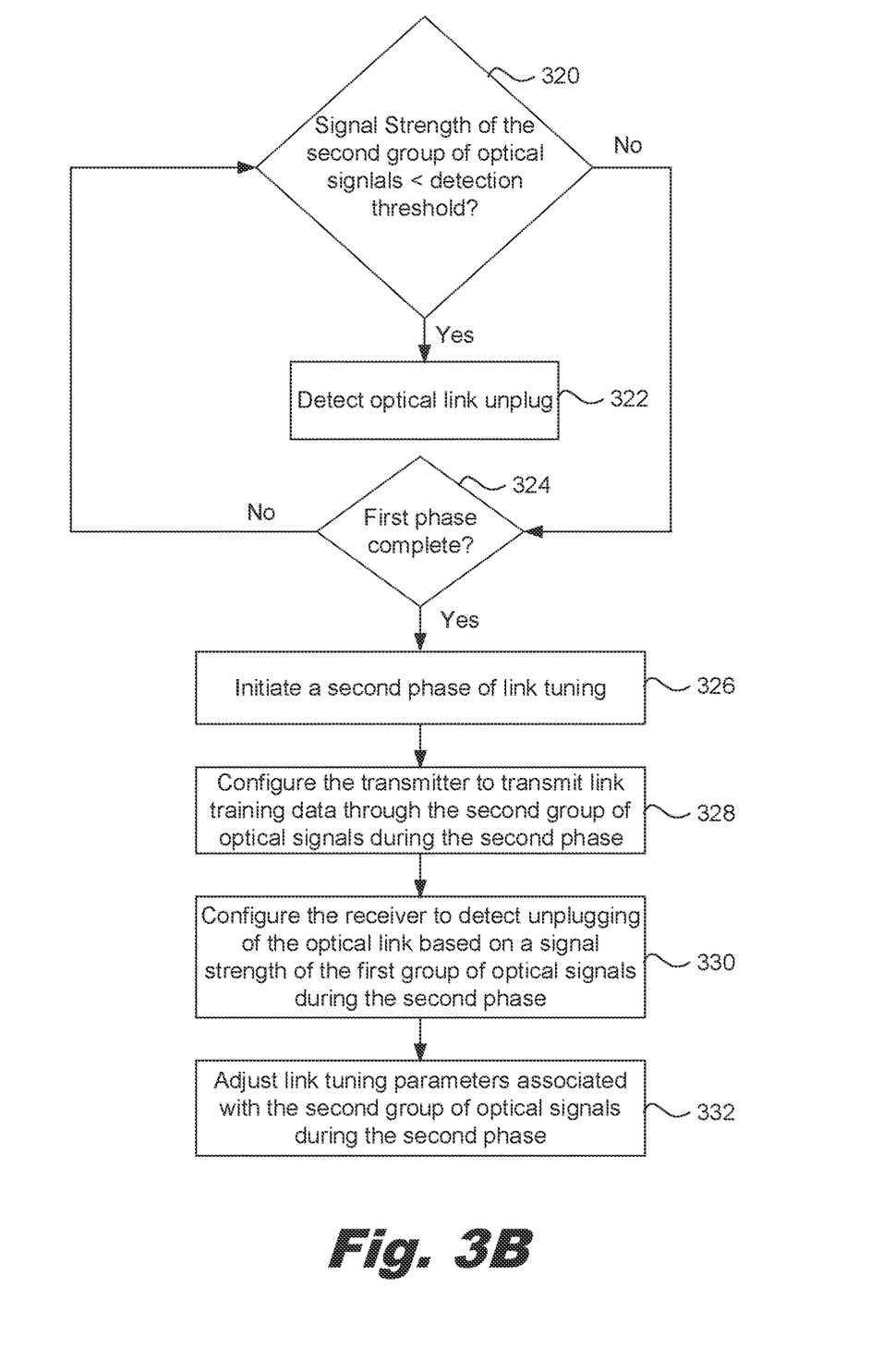

FIG. 3 illustrates a method 300 of link tuning of an optical link between two electronic devices. In an example, the method 300 may be implemented by an optical link tuning, such as the link tuner 155. In an example, the link tuner in combination with a transmitter or a receiver may implement steps of the method 300. The link tuner may include a digital equalizer configured to control operational settings of the transmitter or the receiver. In an example, the link tuner may be coupled to a processor (such as the processing circuitry 120 of FIG. 1) to control operations of the transmitter and receiver and execute steps of the method 300. In another example, the link tuner may include a processing circuit and a storage device storing instructions executable by the processing circuit to perform operations related to link tuning of the optical link.

At block 302, the transmitter may transmit a plurality of optical signals of multiple wavelengths, such that the plurality of optical signals is propagated from the transmitter to a receiver across an optical link. The transmitter may include a multi-wavelength optical source, such as a multi-wavelength laser, which may radiate optical signals of multiple different wavelengths. In an example, the transmitter comprises a plurality of single wavelength optical sources to provide the plurality of optical signals of multiple wavelengths.

At block 304, the link tuner may determine a number of optical signals of different wavelengths (such as four in the example of FIG. 2). At block 306, the link tuner may identify a first wavelength range, such that half of plurality of optical signals is within the first wavelength. At block 308, the plurality of optical signals in the first wavelength range may be filtered to obtain the first group of optical signals. The remaining optical signals in a second wavelength range may be grouped as a second group of optical signals, at block 310.

At block 312, a first phase of link tuning may be initiated by the link tuner. Link tuning may include sending of link training data from the transmitter to the receiver, where the link training data is modulated over the optical signals. The link tuner may configure the transmitter to transmit the link training data through the first group of optical signals during the first phase, at block 314. Thus, the transmitter may transmit the link training data over some of the optical signals transmitted from the receiver (i.e., the first group of optical signals), while the second group of optical signals may be transmitted, as is, from the transmitter to the receiver and does not carry link training data in the first phase. Thus, the amplitude, frequency response, etc., of the second group of optical signals remains substantially pre-controlled and is not varied for link tuning.

At block 316, during the first phase, the receiver (such as receiver 204 of FIGS. 2A and 2B), is configured to detect unplugging of the optical link based on a signal strength of the second group of optical signals. Since, the second group of optical signals are not subjected to link tuning during the first phase, chances of false positives in unplug detection may be reduced by using the second group of optical signals for unplug detection. At block 318, link tuning parameters associated with the first group of optical signals may be tuned.

During the first phase of link tuning, at block 320, it is checked whether the signal strength of the second group of optical signals is less than the detection threshold. In an example, the signal strength of the second group of optical signals may be periodically compared with the detection threshold. In an instance, if the signal strength of one of the second group of optical signals is less than the detection threshold, the receiver may detect that the optical link is unplugged or severed, at block 322. At block 324, it is checked whether the first phase of link tuningis complete. In an example, once adjusting of the link tuning parameters of the first group of optical signals is complete, it may be understood that the first phase of link tuning is complete.

Once the first phase is complete ("Yes" branch from block 324), at block 326 a second phase of link tuning is initiated. In the second phase, at block 328, the transmitter is configured to transmit link training data through the second group of optical signals for adjusting of link tuningparameters associated with the second group of optical signals. Thus, the link tuning parameters associated with the second group of optical signals are varied in the second phase as the second group of optical signals are subjected to link tuning.

At block 330, the receiver is configured to detect unplugging of the optical link based on a signal strength of the first group of optical signals. Since, during the second phase, the first group of optical signals are not subjected to link tuning, they may be used for unplug detection of the optical link. During the second phase, at block 332, link tuning parameters associated with the second group of optical signals may be tuned. Thus, carrying out the link tuning in two phases for different groups of optical signals allows one group of optical signals to be effectively used for unplug detection during each phase thereby enhancing precision of unplug detection.

The various tasks discussed above, including those depicted in FIGS. 3A and 3B, can be performed by physical circuitry, or alternatively by machine-readable instructions executable on a processing circuit. A processing circuit can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. An optical interconnect comprising:
a first electronic device including a transmitter configured to transmit a plurality of optical signals of multiple wavelengths;
a second electronic device including a receiver; and
an optical link coupling the transmitter to the receiver such that the plurality of optical signals is propagated from the transmitter to the receiver across the optical link; and
an optical link tuner coupled to the optical link, wherein the optical link tuner is configured to:
group the plurality of optical signals into a first group of optical signals and a second group of optical signals, wherein the first group of optical signals has a first wavelength range and the second group of optical signals has a second wavelength range; and
adjust link tuning parameters associated with the first group of optical signals during a first phase, such that the second group of optical signals is propagated to the receiver without modifications to link tuning parameters associated with the second group, wherein during the first phase the receiver is to detect unplugging of the optical link based on the second group of optical signals.

2. The optical interconnect of claim 1, wherein the optical link tuner is further configured to:
responsive to completing the first phase, adjust link tuning parameters associated with the second group of optical signals during a second phase, wherein during the second phase the receiver is to detect unplugging of the optical link based on the first group of optical signals.

3. The optical interconnect of claim 2, wherein during the first phase, each of the second group of optical signals have respective signal strengths greater than a signal detection threshold of the receiver.

4. The optical interconnect of claim 3, wherein during the second phase, each of the first group of optical signals have respective signal strengths greater than the signal detection threshold.

5. The optical interconnect of claim 2, wherein the first phase and the second phase are included in a link training stage of the optical link.

6. The optical interconnect of claim 2, wherein, the optical link tuner is to:
configure the transmitter to transmit link training data through the first group of optical signals during the first phase; and
configure the transmitter to transmit link training data through the second group of optical signals during the second phase.

7. The optical interconnect of claim 1, wherein to group the plurality of optical signals, the optical link tuner is to:
determine a number of the plurality of optical signals; and
identify, based on the number of the plurality of optical signals, the first wavelength range such that half of the plurality of optical signals is within the first wavelength range; and
filter the plurality of optical signals in the first wavelength range to obtain the first group of optical signals.

8. The optical interconnect of claim 1, wherein, in response to detection of unplugging of the optical link, the receiver is configured to turn off a transmitter of the second device.

9. The optical interconnect of claim 1, wherein the transmitter comprises a multi-wavelength optical source to provide the plurality of optical signals of multiple wavelengths.

10. The optical interconnect of claim 1, wherein the transmitter comprises a plurality of single wavelength optical sources to provide the plurality of optical signals of multiple wavelengths.

11. A method comprising:
transmitting, by a transmitter of a first device, a plurality of optical signals of multiple wavelengths, wherein the transmitter is coupled to a receiver of a second device by an optical link such that the plurality of optical signals is propagated from the transmitter to the receiver across the optical link;
grouping, by an optical link tuner coupled to the optical link, the plurality of optical signals into a first group of optical signals and a second group of optical signals, wherein the first group of optical signals has a first wavelength range and the second group of optical signals has a second wavelength range; and
adjusting, by the optical link tuner, link tuning parameters associated with the first group of optical signals during a first phase, such that the second group of optical signals is propagated to the receiver without modifications to link tuning parameters associated with the second group, wherein during the first phase the receiver is to detect unplugging of the optical link based on the second group of optical signals.

12. The method of claim 11, further comprising:
responsive to completing the first phase, adjusting link tuning parameters associated with the second group of optical signals during a second phase, wherein during the second phase the receiver is to detect unplugging of the optical link based on the first group of optical signals.

13. The method of claim 12, wherein during the first phase, each of the second group of optical signals have respective signal strengths greater than a signal detection threshold of the receiver.

14. The method of claim 13, wherein during the second phase, each of the first group of optical signals have respective signal strengths greater than the signal detection threshold.

15. The method of claim 12, wherein the first phase and the second phase are included in a link training stage of the optical link.

16. The method of claim 12, further comprising:
configuring the transmitter to transmit link training data through the first group of optical signals during the first phase; and
configuring the transmitter to transmit link training data through the second group of optical signals during the second phase.

17. The method of claim 11, wherein grouping the plurality of optical signals comprises:
determining a number of the plurality of optical signals; and
identifying, based on the number of the plurality of optical signals, the first wavelength range such that half of the plurality of optical signals is within the first wavelength range; and
filtering the plurality of optical signals in the first wavelength range to obtain the first group of optical signals.

18. The method of claim 11, the method comprising, turning off a transmitter of the second device, in response to detection of unplugging of the optical link.

19. The method of claim 11, wherein the transmitter comprises a multi-wavelength optical source to provide the plurality of optical signals of multiple wavelengths.

20. The method of claim 11, wherein the transmitter comprises a plurality of single wavelength optical sources to provide the plurality of optical signals of multiple wavelengths.

* * * * *